5 Sheets—Sheet 1.

W. G. BUDLONG.

PEGGING-MACHINE.

No. 6,965. Reissued Feb. 29, 1876.

Attest:

George H. Mellor

J. A. Miller Jr.

Inventor:

William G. Budlong by Joseph A. Miller his Attorney.

W. G. BUDLONG.

PEGGING-MACHINE.

No. 6,965. Reissued Feb. 29, 1876.

*Attest:*
George H. Mellor
J. A. Miller Jr.

*Inventor:*
William G. Budlong
by Joseph A. Miller
his Attorney.

5 Sheets—Sheet 3.

W. G. BUDLONG.

PEGGING-MACHINE.

No. 6,965. Reissued Feb. 29, 1876.

Attest:
George H. Mellor
J. A. Miller Jr.

Inventor:
William G Budlong
by Joseph A Miller
his Attorney.

5 Sheets—Sheet 4.

W. G. BUDLONG.

PEGGING-MACHINE.

No. 6,965. Reissued Feb. 29, 1876.

Attest:

George H. Mellor.

Joseph A. Miller jr.

Inventor:

William G Budlong by Joseph A Miller his Attorney.

W. G. BUDLONG.

PEGGING-MACHINE.

No. 6,965. Reissued Feb. 29, 1876.

Attest:
George H. Mellor.
J. A. Miller Jr.

Inventor:
William G. Budlong
by Joseph A. Miller
his Attorney

UNITED STATES PATENT OFFICE.

WILLIAM G. BUDLONG, OF PROVIDENCE, RHODE ISLAND.

IMPROVEMENT IN PEGGING-MACHINES.

Specification forming part of Letters Patent No. 38,463, dated May 12, 1863; antedated June 30, 1862; reissue No. 6,965, dated February 29, 1876; application filed September 17, 1875.

*To all whom it may concern:*

Be it known that I, WILLIAM G. BUDLONG, of the city and county of Providence, State of Rhode Island, have invented certain new and useful Improvements in Machinery for Pegging Boots and Shoes; and I do hereby declare that the following is a full, clear, and exact description of the same, reference being had to the annexed drawings, forming part of this specification.

Figure 1:
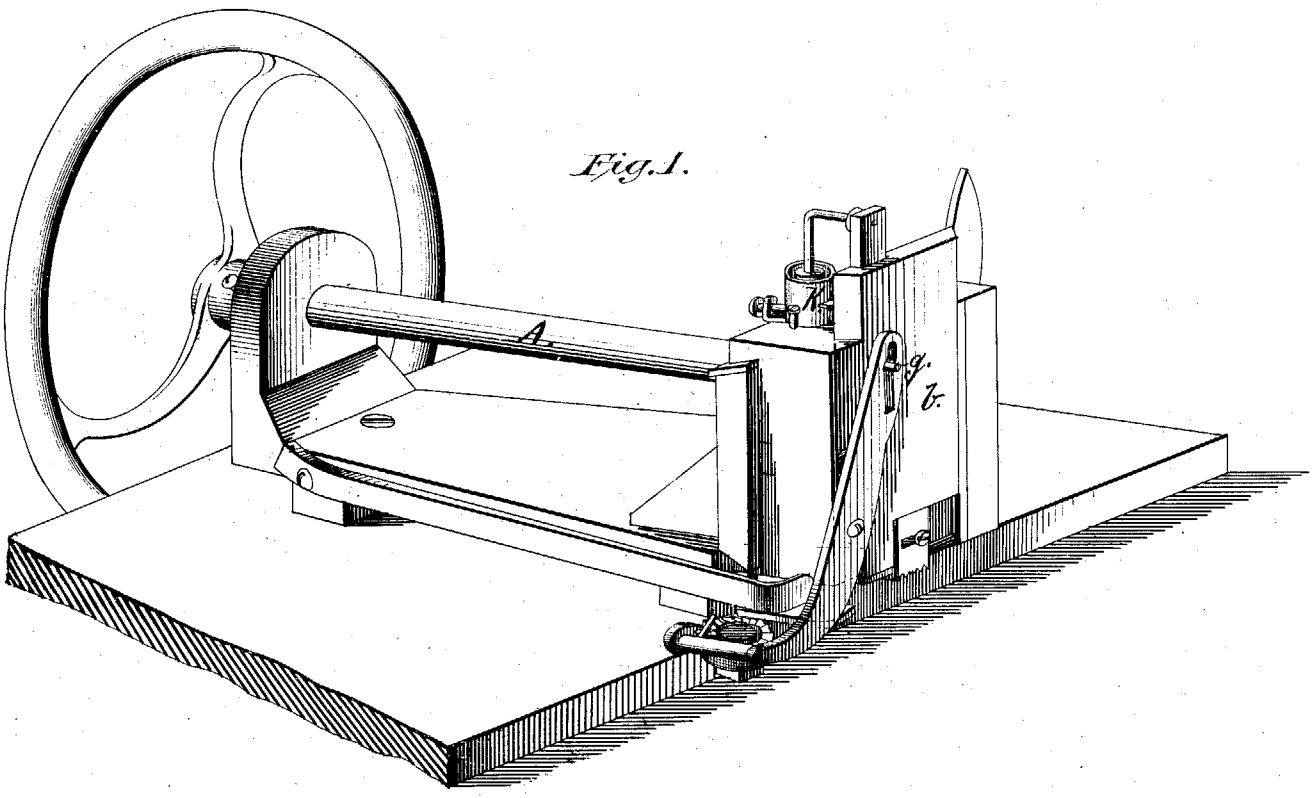
Figure 2:
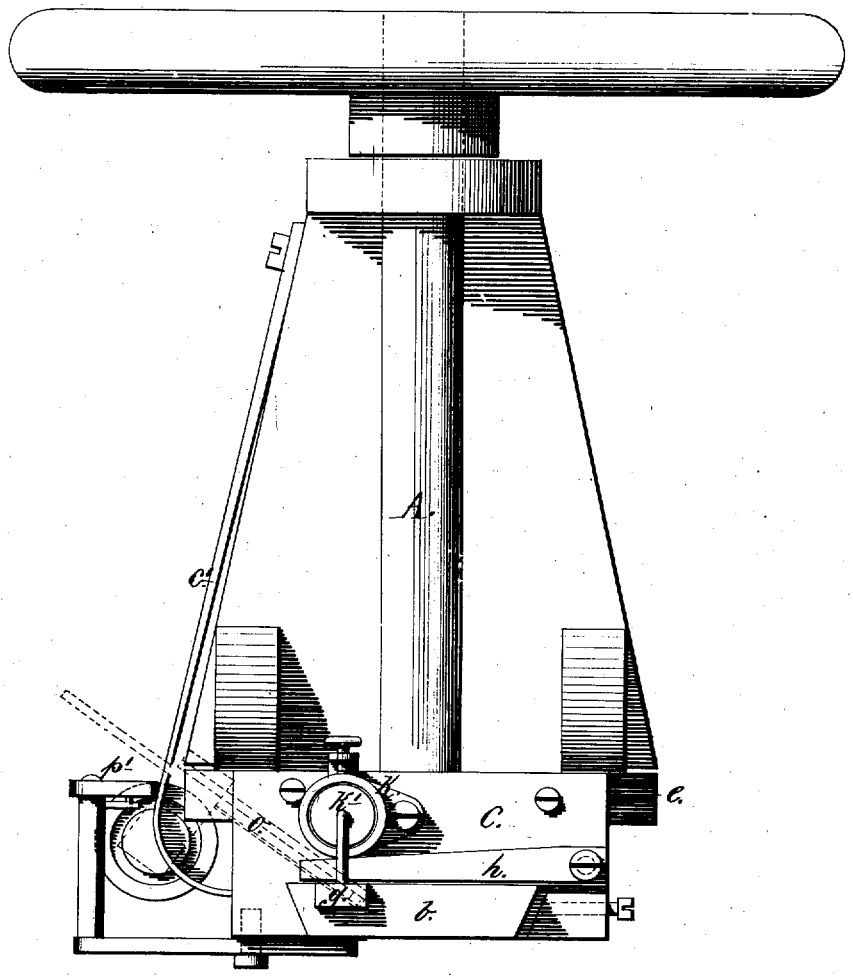
Figure 3:
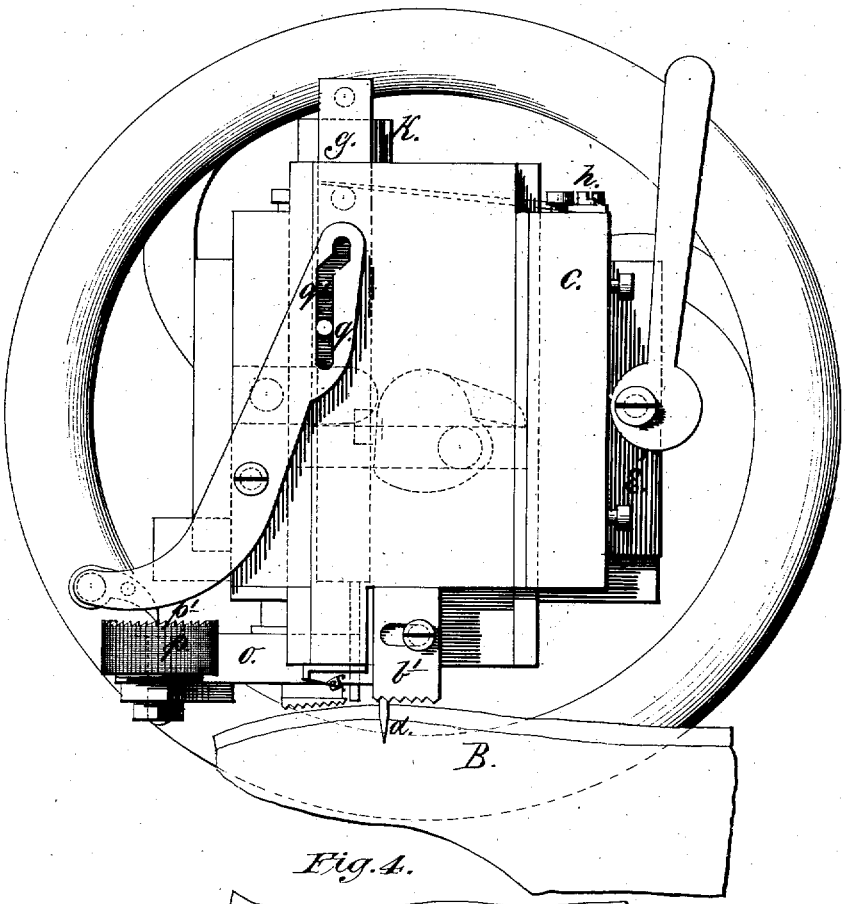
Figure 4:
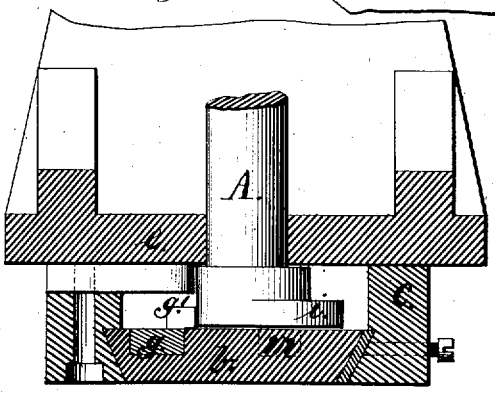
Figure 5:
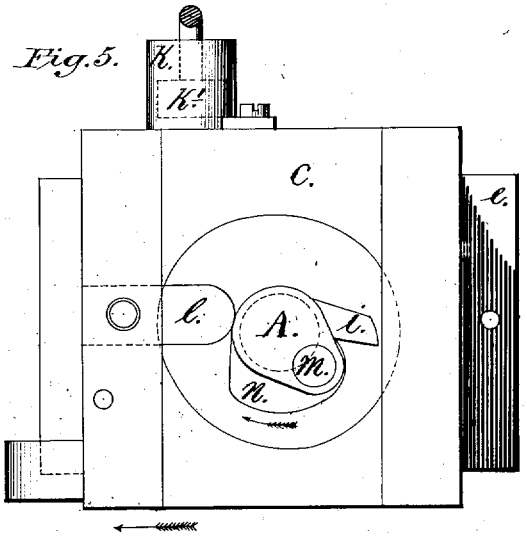
Figure 6:
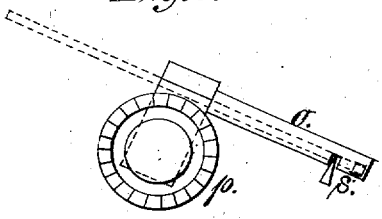
Figure 7:
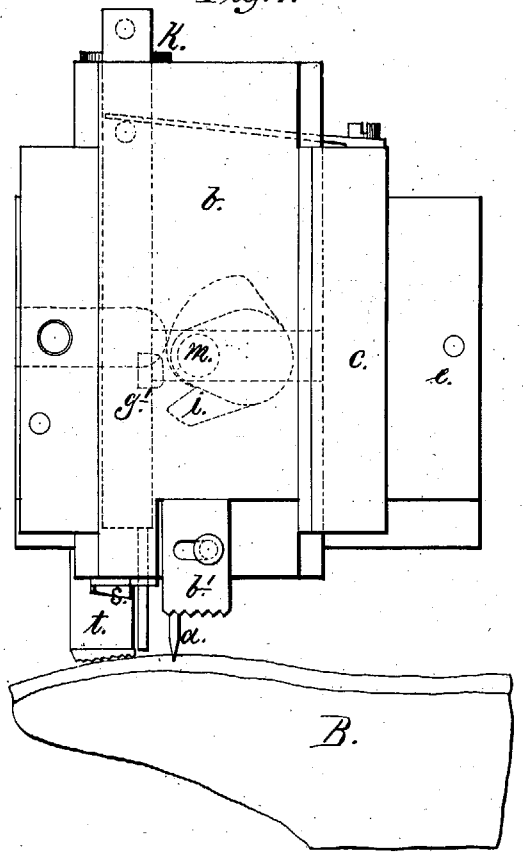

Figure 1 is a perspective view of my machine. Fig. 2 is a view of the upper part of the same. Fig. 3 is a front elevation of the same. Fig. 4 shows the cam and the slide in section. Fig. 5 is a front view, showing the cover removed. Fig. 6 is the feeding device. Fig. 7 is a view of the driving-head, and Fig. 8 a sectional view of the same.

Similar letters of reference indicate corresponding parts.

My improvement in machines for pegging soles of boots and shoes has reference to that class capable of performing the operation automatically by motive power.

The machine is supported upon a suitable bench or table, in such manner that the awl and driver project sufficiently to allow the sole of the boot or shoe to be placed beneath the same, and to be operated upon without interference from the bench or table supporting the machine.

All parts are caused to move by power applied to the single shaft A, as shown in the several figures in the drawings. The awl and driver have vertical and lateral motion in the same planes in both directions, and at fixed distances apart, imparted to them, so that while the shaft is in motion the fastening device, which secures the sole to the boot or shoe, is being made or cut from the material automatically fed thereto, and carried to the proper position to receive the blow from the hammer or driver.

In machinery for securing the soles to boots or shoes it is considered important that, where the fastening device is to penetrate the leather and hold the parts together by friction on the fastening, the same should be driven by a blow rather than by pressure, as the leather will close more tightly around the fastening, and the fastening device is less liable to cramp or crook in its passage.

As the awl and driver are to advance in regular order at fixed distances apart, it has been usual to place both in one stock and to drive both together. This plan is found defective, in that it is difficult to prevent over-driving of the fastening device, especially when the awl is penetrating places in the leather which are softer than in others, since an amount of power must be applied which will overcome the resistance in the hardest places.

By my improvements the awl is driven by a positive force from the shaft by a cam, which can be arranged to drive the awl any desired distance into the leather, while the driver is actuated by the sudden recoil of a suitable spring.

By the use of the dash pot or retarder the action of the spring is so governed that the fastening can be driven either even with the surface of the sole, or below the surface, as is required in channel-work, by regulating the air-cushion so as to arrest the force of the hammer at the proper point.

The awl and driver are fitted independent of each other to holders or stocks, thus allowing the distance between the fastening to be regulated as required, as the awl is attached to the slide having both a vertical and a lateral motion, the driver-stock resting in a vertical slot in the back of the same slide.

Figure 8:
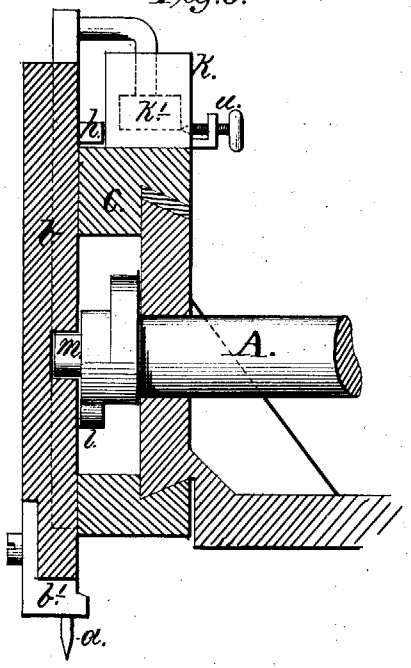

The feed stock or foot *b'*, in which the awl is held, as shown at *a* in the several figures, is secured to the vertically-moving plate *b*, and is furnished with a slot to regulate the distance between the awl and driver, so as to produce either coarse or fine work, the awl being placed the proper distance in advance of the driver. The piece *b* is a flat plate, with beveled edges to fit into a dovetail-groove in the laterally moving piece C, as shown in Figs. 2, 3, and 4. The laterally-moving slide C plays upon a fixed guide, *e*, secured permanently to the table or frame, and is held in place by dovetail-grooves, in the manner described for the piece *b*, as seen in Fig. 8.

The driver, shown at *f*, is a small bar or punch of steel, or other suitable metal, fixed in the end of a stock, by which it is raised and driven upon the fastening device. The stock is shown at *g*, being a bar fitted to lie in a groove on the inside of the plate *b*. At *g'* is a projection or toe, Figs. 3, 4, and 7, by which the stock *g* is lifted through the action of the cam *i*.

The driver is lifted against the force of the spring *h*, which forces the driver on the fastening device, and that into the sole as soon as the driver is permitted to descend by the disengagement of the toe from the cam.

The descent of the peg-driver is controlled by the retarder, so attached as to regulate the force, of the spring, toward the end of the downward motion, by the air-cushion in the dash-pot.

The dash-pot is seen at K, and the plunger at K′ in the several figures. The parts are set in motion by the cams fitted to one end of the shaft A.

The slide-plate *b*, to which the awl is attached, is made to play vertically by means of the crank, the pin *m* of which enters a cross-slot, *m′*, shown in dotted lines in Figs. 3 and 7.

The piece C is caused to move back and forth upon its horizontal slide by the cam *n*, seen in Fig. 5, and shown as if the slide-plate were removed.

The cam *n*, acting upon a projecting pin or plate, *l*, secured to the slide, drives the piece C only in one direction. It is caused to return by the force of a recoil-spring, seen at C′, Fig. 2.

The material for the fastening device is fed along the channel O, Figs. 2, 3, and 6, by means of fluted or corrugated roll or rolls, having a roughened surface, and turned by means of a reciprocating pawl operating upon and engaging with ratchet-wheels secured to or made part of one or both of the rolls. The reciprocating or vibratory motion of the pawl is given by a lever made to operate at the right time by a pin, *q*, Fig. 3, which plays in a crooked or cam slot, *q′*, in said lever.

The operation of the machine is as follows: The boot or shoe, as the case may be, is supported upon a last, which is supported upon a post hinged to the floor, or the last may be held in any other way which will permit of its being carried along in the proper direction by the feed mechanism.

The position of the shoe is shown at B. The edge of the sole is to be kept pressed up against a guide-plate, so that the fastening device may be driven in at the same distance from the edge all around the sole.

The material from which the fastening is to be made or cut being placed into the channel O, revolution is imparted to the driving-shaft A, and the operation commenced at the toe. The plate or vertically-moving slide *b* descends and causes the awl *a* to perforate the sole, at the same time a cutter attached to *b*, shown at S, Figs. 3 and 7, cuts off one fastening device. The cam *n* now arrives at the stud *l*, Fig. 5, and causes the slide C to move in the direction of the arrow. This carries *b* along, while the awl is in the leather, and the serrated foot of *b* pressing against the sole, which feeds by moving the sole with it, as is shown in Fig. 3. The pin *m* next lifts *b*, so that the awl clears the sole, and the cam *n* then passing the stud *l*, the spring C′ forces the slide C back to the place of starting, the sole of the shoe being held meanwhile in a fixed position by means of a roughened surface-stud, which presses down upon the sole, as seen at *t*, Figs. 3 and 7. By these means the driver is advanced over the fastening that has been previously cut from the material and carried along with its channel to its inner end, and will stand directly under the driver.

While in this position the toe *i* will have arrived at the pin *g′* on the stock of the driver *g*, and will cause the latter to be lifted a certain distance. As soon as disengaged, the spring *h* will act to force down the stock *g*, giving the effect of a sudden blow to the fastening device, and thus drive it through a hole in the bottom of the feed-channel into the sole beneath. The retarder now comes into play, as the plunger K′, dropping into the dash-pot K, as the driver descends, cushions upon the air beneath, and thus arrests the force of the blow toward the end of its stroke.

To regulate this part with nicety, an escape-hole is placed near the bottom of the dash-pot, as seen at *u*, Figs. 2 and 8, with a screw-stop to cover it, so that, by screwing this stop out or in, the escape of air is regulated, and thus the velocity of the descent of the driver controlled.

Having thus described my invention, I claim as new and desire to secure by Letters Patent—

1. In a shoe-pegging machine, a reciprocating cutter arranged to separate the fastening device from the material automatically fed to said cutter, the driver, the stock of which travels between closely-fitting guides, and a spring arranged in direct contact with the driver-stock, all combined substantially as set forth, whereby the driver, with its stock, is reciprocated, and acts in a direct line to drive the fastening device home at a single blow by the action of the spring, substantially as and for the purpose specified.

2. In a shoe-pegging machine, a reciprocating cutter, arranged to separate the fastening device from the material automatically fed to said cutter; the reciprocating spring-pressed driver, the stock of the driver having a spring in direct contact therewith; and an adjustable retarder to regulate the force of the blow of the driver, all combined substantially as and for the purpose specified.

3. In a shoe-pegging machine, the combination of the driver, the stock of which travels between closely-fitting guides, and the latter having the spring arranged in direct contact therewith, with means, substantially as described, for raising the driver against the spring, and allowing of its being released and driven in a direct line, to force home the fastening device at a single blow, by the action of the spring, substantially as and for the purpose described.

4. The combination, with the independent driver, of the atmospheric retarder, arranged to control and regulate the descent of said driver, as and for the purpose set forth.

5. The combination of the single cam *m n i* with the spring-pressed driver, the awl, and slides, whereby the driver and awl are vertically reciprocated and the slides laterally moved, substantially as and for the purpose described.

6. The combination, with the stock of the driver, constructed to move between closely-fitting guides and having the spring arranged in direct contact therewith, of a cam secured to the end of the driving-shaft, whereby the driver, urged solely by the spring directly connected therewith, is raised by direct pressure and is allowed to fall across the face of the cam-disk, substantially as and for the purpose specified.

7. The combination of the adjustable stop E with the cam *m*, for regulating the space between the fastening devices, substantially as described.

8. The combination of roughened rolls, adapted and arranged to feed the material to be used in fastening, with the driving-shaft and the intervening mechanism, substantially as described, whereby a positive and intermittent movement is imparted to the rolls, substantially as and for the purpose specified.

9. The combination of roughened rolls with the independent spring-pressed driver, the latter arranged to move in a direct line, to drive the peg home at a single blow by the action of the spring, the said rolls having an intermittent movement imparted to them by a pawl actuated by means substantially as described.

10. The combination, with the awl or piercing instrument, arranged to have a vertical movement independent of the driver and a lateral movement in unison therewith, with the stop E, for automatically feeding the shoe or boot the required space, substantially as and for the purpose specified.

11. The combination of the independently-moving driver, the stock of which travels between closely-fitting guides and has the spring arranged in direct contact therewith, with an adjustable guide-plate for regulating the distance of the row of fastening devices from the edge of the sole, substantially as and for the purpose described.

12. The combination of the spring-pressed driver and the awl, the same constructed to be vertically reciprocated independently of each other in a direct line, and be together laterally moved any desired distance, substantially as and for the purpose specified.

13. The combination of the awl, constructed and arranged to reciprocate in a direct line between closely-fitting guides and independently of the spring-pressed driver, with an adjustable guide-plate for regulating the distance of the row of holes for the fastening devices from the edge of the soles, substantially as and for the purpose specified.

14. In a shoe-pegging machine, the combination of a reciprocating and laterally-moving awl, constructed and arranged to be laterally adjustable independently of the driver, with a reciprocating cutter for separating the material automatically fed to said cutter, the awl and the cutter working in unison, substantially as and for the purpose described.

15. The combination of the reciprocating and laterally-moving awl, constructed and arranged to be laterally adjusted independent of the driver, as set forth, to regulate the distance between the fastening devices, with the independent-driver, the corrugated or roughened feed-rolls, and the reciprocating cutter, substantially as and for the purpose described.

WILLIAM G. BUDLONG.

Witnesses:
JOSEPH A. MILLER,
WM. C. CHASE.